United States Patent [19]
Andrews

[11] 4,059,428
[45] Nov. 22, 1977

[54] METHOD OF FORMING SAGGING MOLD FROM A GLASS CERAMIC

[75] Inventor: Wendell C. Andrews, Mesa, Ariz.

[73] Assignee: Corning Glass Works, Corning, N.Y.

[21] Appl. No.: 659,698

[22] Filed: Feb. 20, 1976

[51] Int. Cl.² .............................................. C03B 23/02
[52] U.S. Cl. ......................................... 65/33; 65/107; 65/287; 65/374 R
[58] Field of Search ...................... 65/107, 287, 374 R, 65/33; 164/46

[56] References Cited

U.S. PATENT DOCUMENTS

| 3,488,174 | 1/1970 | Boudet | 65/374 R X |
| 3,681,043 | 8/1972 | Bognar | 65/107 X |
| 3,992,179 | 11/1976 | Simmons | 65/33 |

Primary Examiner—Arthur D. Kellogg
Attorney, Agent, or Firm—Burton R. Turner; Clarence R. Patty, Jr.

[57] ABSTRACT

A relatively thin, smooth surfaced mold of low thermal expansion material which exhibits non-sticking qualities is disclosed for contouring glass articles, such as by sagging a preform to the contour of the mold. In addition, a method of forming such molds with a desired surface contour is disclosed.

6 Claims, 3 Drawing Figures

METHOD OF FORMING SAGGING MOLD FROM A GLASS CERAMIC

BACKGROUND OF THE INVENTION

The use of molds for sagging glass articles has been well known in the prior art, however such know molds have not been entirely satisfactory due to the cost and complexity of manufacturing the same, and further due to the undesirable physical characteristics exhibited thereby during heat-up and cool-down. That is, metal mold materials generally are not easily formed to exact contours and normally exhibit high thermal expansions which result in the warping of the mold during the hot temperature thermal cycling required for sagging glass, and accordingly an accurate work surface cannot be maintained. Further, the high thermal expansion not only tends to distort the precise curvature formed on the mold surface, but also laterally displaces the desired curvature relative to the glass article being sagged thereon thus producing dimensional problems in the glass being formed. In addition to the problem of high thermal expansion, metals have the further disadvantages of having a relatively low mechanical strength to thickness ratio at required sagging temperatures, the surface has a tendency to oxidize and deteriorate at such temperatures, and expensive finishing operations are required to generate plane or curved surfaces.

Ceramic molds of conventional materials do not provide a durable smooth surface required for sagging, since such molds tend to spall with thermal cycling. In addition, such refractory materials must be of a substantial thickness in order to provide the required strength and handling characteristics. Such thickness requirements, however, necessitate the use of longer thermal cycling periods in view of the heat absorbed by the ceramic mass of the mold.

Accordingly, the present invention has overcome the problems of thermal expansion, surface deterioration, low mechanical strength to thickness ratios, and complex machining requirements associated with the molds of the prior art, by providing an improved mold material which is not only easily formable to a desired surface contour, but which has a low thermal expansion. Further, an improved method of forming a plurality of such molds having virtually identical surface contours is set forth which overcomes the manufacturing problems heretofore encountered in the prior art.

SUMMARY OF THE INVENTION

In its simplest form, the present invention is directed to sagging molds for sagging glass articles to desired contours, and to an improved method of forming such molds with precise contours which maintain their integrity during thermal cycling.

The invention has particular application to the sagging of glass sheets to complex curvatures such as plano-curved surfaces required by automobile windshields, however the invention has equal application for utilization in sagging glass sheets to a planar surface or to a surface forming a portion of a surface of revolution, such as might be utilized for sagging skirtless television panels.

The mold of the present invention is formed from a refractory glass-ceramic having a relatively low coefficient of thermal expansion. Such materials provide for the formation of excellent glass-ceramic shell molds for sagging glass articles since such materials can be easily formed to complex shapes with smooth surfaces by heating sagging, and when once formed they are thermally stable and do not detrimentally change size or shape during repeated cycling, and finally because of their strength they can be made relatively thin in cross sectional areas which facilitates fast thermal cycling when sagging glass articles to a desired contour.

In view of the fact that sagged glass articles such as windshields or TV panels become a part of a subassembly and must cooperate with other members in a predetermined manner, it is imperative that all of the glass-ceramic sagging molds for a given article be virtually identical, so that the sagged product from any such mold may be interchangeably utilized in the final assembly. Thus, according to the present invention a master mold is formed from which a plurality of glass-ceramic shell molds are formed having virtually identical contours for sagging articles into conformity therewith.

It thus has been an object of the present invention to overcome the problems of thermal expansion, surface distortion and deterioration, and low strength to weight ratios encountered with glass sagging molds of the prior art, by means of easily formable smooth surfaced molds of low thermal expansion made of a crystalline glass-ceramic material.

It is a further object of the invention to provide a process for repeatably producing glass-ceramic sagging molds with identical contours such that glass articles sagged thereon may be used interchangeably within subassemblies of which they become a part.

BRIEF DESCRIPTION OF THE DRAWINGS

The drawings schematically illustrate the method of forming a plurality of identical sagging molds from a master mold wherein.

DESCRIPTION OF THE PREFERRED EMBODIMENTS

Figure 1:
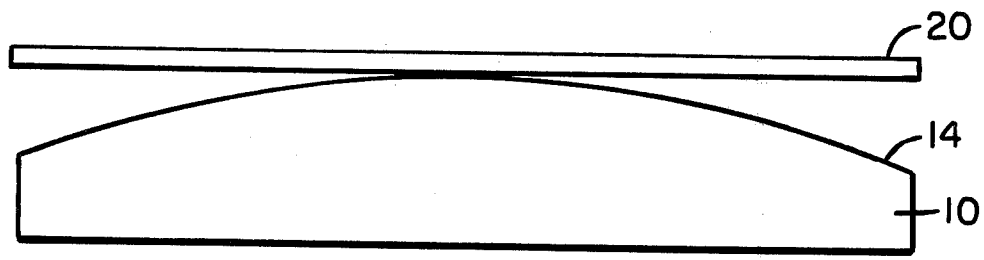
FIG. 1 illustrates the positionment of a ground sheet of green glass-ceramic material positioned upon a master mold for sagging and ceramming within a suitable kiln.
Figure 2:
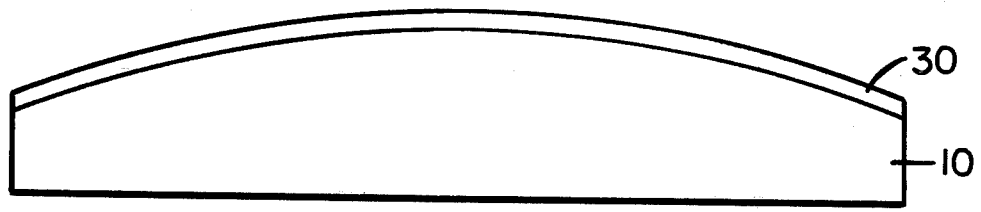
FIG. 2 illustrates the sheet of glass-ceramic material after it has sagged to conform to the shape of the master mold.
Figure 3:
FIG. 3 illustrates the finished shell mold of a glass-ceramic material which was crystallized and rigidified after sagging by being passed through a ceramming or heat-treatment cycle.

In forming the sagging mold of the present invention, a sheet of glass material which is crystallizable into a crystalline glass-ceramic material is ground to a desired thickness and surface flatness while in its "green glass-ceramic" state and before being crystallized into a glass-ceramic material. That is, a shell mold blank is cut from a sheet of green glass ceramic material with a predetermined size which will be greater than the size of the glass article to be sagged thereon, but not larger than the master mold upon which the sagging shell mold is to be formed. While in its flat state, the blank is ground on both sides to a desired thickness and surface flatness, and the edges are ground with an edging wheel which gives a rounded edge with a nominal radius.

The ground blank of green glass-ceramic material is then placed upon a master mold having a predetermined surface contour. The master mold and the green glass-ceramic sheet are positioned within a kiln and fired so as to sag the sheet into conformity with the predetermined contour of the master mold and to ceram (i.e. transform the material from a predominantly glassy state to a predominantly crystalline state through heat treatment) the sagged sheet into a crystalline glass-ceramic sagging or shell mold having a surface contour virtually identical with that of the master mold.

The above-described process is schematically shown in the drawings, wherein a shell mold blank or sheet of green glass-ceramic material 20 is positioned upon a master mold 10 having a previously predetermined surface 14 of the desired contour. The master mold 10 and the green glass-ceramic sheet 20 are positioned within a suitable kiln and subjected to a heat treatment cycle such that the shell mold blank 20 while in its green state is sagged to conform to the contour of surface 14 and then is cerammed into a rigid glass ceramic shell or sagging mold 30. The surface 34 of the shell mold 30 is identical with and conforms to the prescribed contour of surface 14 of master mold 10. As will be readily apparent, a plurality of shell molds or sagging molds 30 having identical contoured surfaces 34 may be formed from a single master mold 10 merely by repeating the sagging and ceramming cycle with consecutively presented shell mold blanks.

It should be recognized that a key feature of the overall process is the ability to grind the required surface finish on the sheet while it is in its green state and while in the flat sheet form, and the ability to maintain such surface through the forming and ceramming operation. That is, the grinding of a flat surface, particularly when the material is in its glassy or green state, is relatively easy to perform and merely involves standard grinding equipment.

The thickness of the sagging mold 30 may vary over a relatively wide range as desired, with the minimum thickness being determined by the necessary structural strength of the shell mold for supporting the article to be sagged, and the maximum thickness being limited by the amount of lost efficiencies which can be tolerated during the sagging cycle due to greater heat retention in the mold requiring longer time periods to dissipate the applied energy. Satisfactory results have been obtained utilizing molds having a uniform thickness of form about one-fourth to about one-half inch and flatness variations over a twelve inch span of not greater than about ±0.001 inch, with compositions similar to those shown in Table I of U.S. Pat. No. 3,582,371.

When sagging and ceramming the green glass-ceramic blank 20, it is necessary to control the temperature cycle so that the sagging of the sheet to the conformity of surface 14 of master mold 10 is completed before sufficient nucleation and crystallization take place which result in the ridigification of the sheet. In other words, the ceramming temperature cycle is so controlled such that the temperature of the master mold and blank is elevated at a fairly rapid rate to effect sagging of the blank to the master mold prior to excessive nucleation. The cycle temperature then is again elevated to effect further nucleation, and finally the cycle is raised to form a rigid crystalline structure which is then cooled at a controlled rate to room temperature. For example when utilizing a sheet of Corning Code 0329 green glass-ceramic of a composition within the context of the disclosure of U.S. Pat. No. 2,920,971, the following schedule was used: 100° C./hour to 600° C., hold for 2 hours, 100° C./hour to 725° C., hold for 2 hours, 60° C./hour to 1075° C., hold for 1 hour, and allow the resulting sagged and cerammed mold to cool for approximately 36 hours within the firing kiln.

Although it will be understood that a variety of glass-ceramic compositions may be utilized to form the shell type sagging mold of the present invention, it is necessary for operability of the mold that it be thermally stable and highly refractory so as to withstand sagging cycles of up to at least about 730° C without failing and that it have a relatively low coefficient of thermal expansion so that it will remain dimensionally stable during the heat-up and cool-down of repeated sagging cycles. A relatively low coefficient of thermal expansion of less than about $20 \times 10^{-7}/°$ C. such as shown in Table II of U.S. Pat. No. 3,582,371 is deemed sufficient to provide the necessary degree of dimensional stability. Generally, a highly crystalline glass-ceramic normally results in a relatively low coefficient of thermal expansion. Although not limited thereto, a preferred glass-ceramic composition is one comprising a beta-spodumene solid solution dispersed within a glassy matrix with a crystallinity of at least about 80%, such as those compositions disclosed in Table I of U.S. Pat. No. 3,582,371.

The master mold may be formed either by a casting process or by machining a master mold blank, When it is necessary to provide the sagging mold with a rather complex curvature such as that incorporated within an automobile windshield, a suitable pattern representing the desired curvature but compensated for the shell mold thickness is made from a easily formable material such as wood. A female plaster mold may then be cast from the compensated pattern. Finally, the master mold may then be cast from the plaster cast female mold, which then represents the desired curvature and contour for forming the shell mold upon which the windshield blanks are to be sagged. The master mold may be formed of any suitable easily castable but durable and and stable material such as castable petalite or alumina materials. When, however, the desired surface contour is spherical, the master mold surface can be generated on a conventional grinder such as is used to generate lenses, and accordingly no pattern or special equipment is required to produce extremely accurate spherica surfaces. A suitable material which may be utilized to form such a machined master mold is a beta-spodumene containing low thermal expansion ceramic such as disclosed in U.S. Pat. No. 3,600,204 which has been layed up in a honeycomb fashion as disclosed in U.S. Pat. No. 3,112,184, and sold by Corning Glass Works under the trademark CERCOR ®. Such material has good thermal stability up to about 1200° C., has a low thermal mass, and machines easily to a surface which is satisfactory for making glass-ceramic shell molds. A blank of such material is ground to the desired shape and many identical shell molds may be produced from a single master mold without the need of subsequent finishing.

As a specific example, but by no means limiting in nature, a shell mold blank was cut from an as-drawn sheet of green glass ceramic material having a thickness of approximately 0.3 inch and having a composition similar to that of Example 1 in Table I of U.S. Pat. No. 3,582,371. The blank was cut with a size larger than that of the glass article to be sagged, but smaller than the master mold. While in its green glass-ceramic state, and while flat, the blank was ground on both sides to a thickness of about 0.25 inch with both sides being substantially parallel. In addition, the edges were ground with an edging wheel to provide a rounded edge with a nominal radius of about 0.125 inch. The blank was placed upon a cast petalite master mold and the master mold and green glass-ceramic blank were run on a programmed temperature cycle in a kiln so as to preheat the mold and green glass-ceramic, sag the green glass-ceramic to the contour of the master mold, and ceram or crystallize the glass-ceramic material without changing the contour match with the master mold. A representative cycle for sagging and ceramming such material is to initially raise the temperature at a rate of about 300° C./hour to between about 750° C. and hold at such temperature for two hours, and then raise the temperature to about 1125° C. and hold for two hours, and finally cool to room temperature with a hold of about 5 hours at 600° C.

Thus, the present invention not only sets forth a new and novel sagging mold for sagging glass articles, but also discloses a method for forming such molds. The utilization of shell molds as disclosed in the present invention provides the following advantages:

1. The molds are lightweight, and accordingly overall handling is easier.
2. Because the molds are lightweight, they have a low thermal mass, which reduces the heat requirement for use in the kiln.
3. The molds are relatively inexpensive to make.
4. The molds are durable in that they do not dent or scratch easily.
5. The molds are stable over a wire range of temperature variations, in that they do not distort, oxidize, warp or spall off.

Although the now preferred embodiments of the invention have been disclosed, it will be apparent to those skilled in the art that various changes and modifications may be made thereto without departing from the spirit and scope thereof as defined in the appended claims.

I claim:

1. A method of forming a thermally and dimensionally stable sagging mold of low thermal mass for repeatably sagging glass articles to a desired surface contour which comprises, forming a master mold with a surface contour corresponding to that desired for the finished sagged glass articles, grinding a sheet of glassy material which is crysatllizable upon the application of heat into a highly refractory glass-ceramic material which can withstand sagging cycles of up to at least 730° C. without failure to a desired thickness, positioning said ground sheet of glassy material upon said master mold, applying heat to sag said sheet of glassy material into conformity with the contoured surface of said master mold, applying additional heat to crystallize said sheet of material into a glass-ceramic material having a maximum coefficient of thermal expansion of about $20 \times 10^{-7}$/°C., and cooling said sagged and crystallized sheet to form a dimensionally stable rigidified glass-ceramic sagging mold.

2. A method of forming a sagging mold as defined in claim 1 including the step of generating the surface contour of said master mold within the surface of a low thermal expansion ceramic mold blank.

3. A method of forming a sagging mold as defined in claim 1 including the steps of forming a suitable pattern representing the desired curvature of said master mold from an easily formable material, casting a female plaster mold from said pattern, and with an easily castible but durable and stable material casting a master mold from the plaster cast female mold to thus provide a master mold with the desired curvature and contour for forming the glass-ceramic sagging mold.

4. A method of forming a sagging mold as defined in claim 1 wherein heat is applied to said glassy material to convert the same into a glass-ceramic material comprising a beta-spodumene solid solution dispersed within a glassy matrix with a crystallinity of at least about 80%.

5. A method of forming a sagging mold as defined in claim 1 wherein said sheet of glassy material is ground before sagging to a thickness of from about one-fourth to about one-half inch.

6. A method of sagging a glass article to a desired surface contour which comprises, providing a sagging mold of glass-ceramic material having a predetermined contour corresponding to the desired surface contour of the finished sagged article, positioning the article to be sagged upon said sagged mold, subjecting the article and mold to a thermal cycle and sagging the article into desired conformity with the surface contour of said mold, maintaining the dimensional stability of said mold during the heat-up and cool-down of the sagging cycle with said mold having a maximum coefficient of thermal expansion of about $20 \times 10^{-7}$/° C., and facilitating the dissipation of heat energy for effective thermal cycling by limiting the thickness of said glass-ceramic sagging mold to a maximum not substantially greater than one-half inch.

* * * * *

UNITED STATES PATENT AND TRADEMARK OFFICE
CERTIFICATE OF CORRECTION

PATENT NO. : 4,059,428
DATED : November 22, 1977
INVENTOR(S) : Wendell C. Andrews It is certified that error appears in the above-identified patent and that said Letters Patent are hereby corrected as shown below:

Column 1, line 7, "know" should read --known--; Column 2, line 1, "heating" should read --heat--; column 3, line 42, "form" should read --from--; column 4, line 36, delete "and"; column 4, line 41, "spherica" should read --spherical--; column 5, line 9, after "and" insert --800°C., and--; column 5, claim 1, line 43, "crysatllizable" should read --crystallizable--.

Signed and Sealed this

Thirteenth Day of June 1978

[SEAL]

Attest:

RUTH C. MASON
Attesting Officer

DONALD W. BANNER
Commissioner of Patents and Trademarks